United States Patent
Cho et al.

(10) Patent No.: US 10,261,625 B2
(45) Date of Patent: Apr. 16, 2019

(54) TOUCH SENSOR INTEGRATED DISPLAY DEVICE

(71) Applicant: LG DISPLAY CO., LTD., Seoul (KR)

(72) Inventors: Seungwan Cho, Yangju-si (KR);
Kwangjo Hwang, Goyang-si (KR);
Sungho Hong, Incheon (KR);
Byeongseong So, Goyang-si (KR);
Ruda Rhe, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/388,764

(22) Filed: Dec. 22, 2016

(65) Prior Publication Data

US 2017/0192593 A1 Jul. 6, 2017

(30) Foreign Application Priority Data

Dec. 30, 2015 (KR) .................. 10-2015-0190240

(51) Int. Cl.
| | |
|---|---|
| *G06F 3/041* | (2006.01) |
| *G06F 3/044* | (2006.01) |
| *G02F 1/1333* | (2006.01) |
| *G09G 3/20* | (2006.01) |

(52) U.S. Cl.
CPC ........ *G06F 3/0416* (2013.01); *G02F 1/13338* (2013.01); *G06F 3/044* (2013.01); *G06F 3/0412* (2013.01); *G09G 3/20* (2013.01)

(58) Field of Classification Search
CPC ............... G06F 3/044; G06F 3/0412; G06F 2203/04111

USPC ....................................................... 345/173
See application file for complete search history.

(56) References Cited

U.S. PATENT DOCUMENTS

| | | | | |
|---|---|---|---|---|
| 2016/0291752 | A1* | 10/2016 | Li | .................. G06F 3/0412 |
| 2017/0010724 | A1 | 1/2017 | Cao et al. | |
| 2017/0228068 | A1 | 8/2017 | Pu et al. | |
| 2017/0329442 | A1* | 11/2017 | Wang | .................. G06F 3/0412 |

FOREIGN PATENT DOCUMENTS

| | | |
|---|---|---|
| CN | 104505040 A | 4/2015 |
| CN | 104699318 A | 6/2015 |
| CN | 104951161 A | 9/2015 |

(Continued)

*Primary Examiner* — Yuzhen Shen
(74) *Attorney, Agent, or Firm* — Seed IP Law Group LLP

(57) ABSTRACT

The present disclosure relates to a touch sensor integrated display device capable of preventing generation of a defective image between touch/common electrodes, which includes a plurality of gate lines and a plurality of data lines intersecting the gate lines, a plurality of pixel electrodes, a plurality of touch/common electrodes and a plurality of touch/common lines. The plurality of pixel electrodes are respectively disposed in regions defined by intersections of the plurality of data lines and the plurality of gate lines and provided with data voltages. The plurality of touch/common electrodes are arranged to generate electric fields with the plurality of pixel electrodes and to correspond to parts of the plurality of pixel electrodes. The plurality of touch/common lines are respectively connected to the plurality of touch/common electrodes. Each touch/common electrode overlap with at least one gate line shared by neighboring touch/common electrodes arranged in a data line arrangement direction.

15 Claims, 14 Drawing Sheets

(56) References Cited

FOREIGN PATENT DOCUMENTS

| JP | 2015-122057 A | 7/2015 |
| JP | 2017-504139 A | 2/2017 |
| KR | 10-2012-0121705 A | 11/2012 |

* cited by examiner

TOUCH SENSOR INTEGRATED DISPLAY DEVICE

CROSS-REFERENCE TO RELATED APPLICATIONS

This application claims the benefit of priority under 35 U.S.C. § 119(a) to Republic of Korea Patent Application No. 10-2015-0190240 filed on Dec. 30, 2015, the entire contents of which is incorporated herein by reference for all purposes as if fully set forth herein.

BACKGROUND

Technical Field

The present disclosure relates to a touch sensor integrated display device and, more specifically, to a touch sensor integrated display device capable of preventing generation of a defective image between touch/common electrodes.

Discussion of the Related Art

Recently, flat panel display devices (simply referred to hereinafter as "display devices") that are inexpensive, can increase in size and have high display quality (video expression, resolution, brightness, contrast and color reproducibility, etc.) are under development to meet demands for display devices capable of displaying multimedia with the development of multimedia. Such flat panel display devices use various input devices such as a keyboard, a mouse, a track ball, a joystick and a digitizer to constitute an interface between a user and a display device.

However, to use the aforementioned input devices, users need to learn how to use them and an additional space is required therefor, causing inconvenience and having difficulty elevating product design. Accordingly, there is increasing demand for an input device for display devices, which is convenient and simple and can reduce malfunctions. To meet such demand, a touch sensor capable of recognizing information input by a user by touching a screen of a display device with his or her hand or a pen while viewing a display device has been proposed.

The touch sensor is applied to various display devices because it is simple and rarely malfunctions and a user can apply input thereto without using an additional input device and rapidly and easily manipulate content displayed on a screen using the same.

The touch sensor used for display devices can be classified into an add-on type, an on-cell type and an integrated type or in-cell type according to structure thereof. The add-on type touch sensor is achieved by individually manufacturing a display device and a touch sensor module and then attaching the touch sensor module to an upper surface of the display device. The on-cell type touch sensor is realized by directly forming touch sensor elements on an upper glass substrate of a display device. The integrated type touch sensor is formed by integrating touch sensor elements into a display device to achieve a thin display device and improve durability.

From among the various types of touch sensors, the integrated type touch sensor is widely used because a common electrode of a display device can also be used as a touch electrode (hereinafter, the dual common and touch electrode may be referred to as a "touch and common electrode," or alternatively, as a "touch/common electrode") to reduce the thickness of the display device and touch elements are formed inside of the display device to improve durability.

The integrated type touch sensor attracts interest because it has durability and can realize a decrease in thickness to solve problems of the add-on type touch sensor and the on-cell type touch sensor. The integrated type touch sensor is classified into an optical type and a capacitive type according to touch point sensing method, and the capacitive type is subdivided into a self-capacitive type and a mutual capacitive type.

The self-capacitive type touch sensor includes a plurality of independent patterns formed in a touch area of a touch sensing panel and measures a capacitance variation in each independent pattern to determine whether touch is applied. In the case of the mutual capacitive type touch sensor, x-axis electrode lines (e.g., driving electrode lines) intersect y-axis electrode lines (e.g., sensing electrode lines) to form a matrix in a touch/common electrode formation area of a touch sensing panel, driving pulses are applied to the x-axis electrode lines and then voltage variations appearing at sensing nodes defined at intersections of the x-axis electrode lines and the y-axis electrode lines are sensed through the y-axis electrode lines to determine whether touch is applied. As used herein, the term "intersect" does not require physical connection between intersecting lines, but instead may be used to describe a relationship where one line crosses over another line.

In the mutual capacitive type touch sensor, however, mutual capacitance generated during touch sensing is very small whereas parasitic capacitance between a gate line and a data line constituting a display device is very large, and thus it is difficult to correctly detect a touch point due to the parasitic capacitance.

Furthermore, the mutual capacitive type touch sensor requires a very complicated wiring structure because a plurality of touch driving lines for touch driving and a plurality of touch sensing lines for touch sensing need to be formed on common electrodes for multi-touch recognition.

The self-capacitive type touch sensor can improve touch accuracy with a simple wiring structure compared to the mutual capacitive type touch sensor and thus is widely used.

A description will be given of a self-capacitive type touch sensor integrated LCD (referred to as "touch sensor integrated display device" hereinafter) of the related art with reference to FIGS. 1 to 3.

FIG. 1 is a plan view schematically illustrating the touch sensor integrated display device of the related art. FIG. 2 is a plan view of a region R1 shown in FIG. 1. FIG. 3 is a waveform diagram illustrating a common voltage coupling effect of touch/common electrodes according to gate signals supplied to gate lines overlapping with touch/common electrodes in a row and touch/common electrodes in the next row.

The touch sensor integrated display device includes an active area AA in which touch/common electrodes and pixel electrodes are arranged and data is displayed, and a bezel area BA outside the active area AA and including various wires and touch controllers ICs arranged therein.

The active area AA includes a plurality of touch/common electrodes T11 to T8a arranged in a first direction (e.g., x-axis direction) and a second direction (e.g., y-axis direction) perpendicular to each other, and a plurality of touch/common lines (which may alternatively be referred to herein as "touch and common lines") W11 to W8a arranged in parallel in the second direction to connect the plurality of touch/common electrodes T11 to T8a to a touch controller 10.

The plurality of touch/common electrodes T11 to T8a arranged in the active area AA are formed in such a manner that common electrodes of a previous display device are divided, operate as common electrodes in a display mode of displaying data and operate as touch electrodes in a touch mode of detecting a touch point.

Referring to FIG. 2, in the touch sensor integrated display device of the related art, a plurality of pixel electrodes (not shown) is arranged corresponding to a single touch/common electrode T11, for example. The plurality of pixel electrodes is arranged in an area defined by intersections of gate lines G11 to G2c and data lines D1 to D18. In the example shown in FIG. 2, 108 pixel electrodes are arranged corresponding to one touch/common electrode T11 in an area defined by 12 gate lines G11 to G1c and 9 data lines D1 to D9 intersecting the gate lines G11 to G1c.

Touch/common electrodes T11, T12, T21 and T23 are provided with a common voltage through touch/common lines W11, W12, W21 and W22 in a display driving period and are provided with a touch driving voltage in a touch driving period. The touch/common lines W11, W12, W21 and W22 provide a touch sensing voltage sensed from the touch/common electrodes T11, T12, T21 and T23 to the touch controller 10 in the touch driving period. The touch controller 10 determines whether touch is applied and a touch point using a known touch algorithm.

Referring to FIG. 3, when gate signals are sequentially provided to (1-1)th to (1-c)th gate lines G11 to G1c corresponding to the touch/common electrodes T11 to T1a arranged in the first row, coupling is generated in touch/common electrodes T11 to T1a and T21 to T2a due to on/off voltages of the gate signals supplied to the gate lines and thus ripple voltages are generated at a rising edge and a falling edge of each gate signal.

The ripple voltages are generated when a gate signal is supplied to each gate line but are offset by a subsequent gate signal. For example, ripple voltages of the touch/common electrodes T11 to T1a due to a falling edge of the gate signal supplied to the (1-6)th gate line G16 are offset by ripple voltages of the touch/common electrodes T11 to T1a due to a rising edge of the gate signal supplied to the (1-9)th gate line G19, ripple voltages of the touch/common electrodes T11 to T1a due to the (1-7)th gate line G17 are offset by ripple voltages of the touch/common electrodes T11 to T1a due to the (1-10)th gate line G1a, ripple voltages of the touch/common electrodes T11 to T1a due to the (1-8)th gate line G18 are offset by ripple voltages of the touch/common electrodes T11 to T1a due to the (1-11)th gate line G1b, and ripple voltages of the touch/common electrodes T11 to T1a due to the (1-9)th gate line G19 are offset by ripple voltages of the touch/common electrodes T11 to T1a due to the (1-12)th gate line G1c.

However, the ripple voltages of the touch/common electrodes T11 to T1a due to falling edges of the gate signals supplied to the (1-10)th to (1-12)th gate lines G1a to G1c are not offset because the (2-1)th gate line G21 and the (2-2)th gate line G22 are arranged to correspond to touch/common electrodes T21 to T2a arranged in the second row.

Accordingly, a common voltage level becomes unstable due to a ripple voltage level difference between the touch/common electrodes arranged in the same row and boundaries thereof, causing a defective image in the form of a bright horizontal line according to common voltage value variation in the touch sensor integrated display device of the related art.

BRIEF SUMMARY

The present disclosure provides a touch sensor integrated display device capable of eliminating a defective image in a horizontal line, generated between touch/common electrodes.

In one aspect, there is provided a touch sensor integrated display device comprising: a plurality of gate lines and a plurality of data lines crossing over the gate lines; a plurality of pixel electrodes respectively disposed in regions defined by cross of the plurality of data lines and the plurality of gate lines and provided with data voltages; a plurality of touch/common electrodes arranged to generate electric fields with the plurality of pixel electrodes and to correspond to parts of the plurality of pixel electrodes; and a plurality of touch/common lines respectively connected to the plurality of touch/common electrodes, wherein each touch/common electrode overlap with at least one gate line shared by neighboring touch/common electrodes arranged in a data line arrangement direction.

Each touch/common electrode includes at least one protrusion in the data line arrangement direction, and protrusions of touch/common electrodes adjacent to each other in the data line arrangement direction are alternately arranged in a direction of the gate lines.

Each touch/common electrode includes at least one protrusion and at least one recess alternately disposed at sides facing neighboring touch/common electrodes arranged in the data line arrangement direction, and the protrusions of the touch/common electrodes are disposed in neighboring recesses in the data line arrangement direction.

Protrusions and recesses of touch/common electrodes arranged in a first row and the last row are disposed at only one side facing neighboring touch/common electrodes arranged in the data line arrangement direction, and protrusions and recesses of touch/common electrodes arranged between the first row and the last row are disposed at both sides facing neighboring touch/common electrodes arranged in the data line arrangement direction.

The protrusions and recesses of the touch/common electrodes, disposed at both sides, include first protrusions and first recesses alternately disposed at a first side and second protrusions and second recesses alternately disposed at a second side, and the first protrusions and the second protrusions are alternately arranged and the first recesses and the second recesses are alternately arranged.

The touch/common electrodes arranged in the first row and the touch/common electrodes arranged in the last row have the same size, and the size of touch/common electrodes arranged between the first row and the last row is greater than the size of the touch/common electrodes arranged in the first row and the last row by the size of the protrusions formed at the second side.

The number of gate lines shared by the touch/common electrodes arranged in the first row equals the number of gate lines shared by the touch/common electrodes arranged in the last row, and the number of gate lines shared by the touch/common electrodes arranged between the first row and the last row is greater than the number of gate lines shared by the touch/common electrodes arranged in the first or last row.

Gate pulses are sequentially supplied to the plurality of gate lines, and the number of gate lines shared by touch/common electrodes neighboring to each other in the data line arrangement direction is twice the number of gate pulses partially overlapping with one of the gate pulses.

Overlapping of gate pulses includes overlapping of a rising edge and a falling edge of gate pulses.

According to a touch sensor integrated display device according to the present disclosure, gate lines arranged between vertically neighboring touch/common electrodes overlap with touch/common electrodes in the following row to eliminate a ripple voltage at the boundary between touch/common electrodes, thus improving or eliminating defective images in horizontal lines.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE ILLUSTRATED EMBODIMENTS

Reference will now be made in detail to embodiments of the disclosure, examples of which are illustrated in the accompanying drawings. Wherever possible, the same reference numbers will be used throughout the drawings to refer to the same or like parts. Detailed description of the known art will be omitted if it is determined that such description might obscure the embodiments of the disclosure.

A touch sensor integrated display device of the present disclosure may be implemented as a flat panel display device such as a liquid crystal display (LCD), a field emission display (FED), a plasma display panel (PDP), an organic light emitting diode (OLED) display or an electrophoretic display (EPD). While the LCD will be described as an exemplary flat panel display device in the following description, the present disclosure is not limited thereto. For example, the touch sensor integrated display device of the present disclosure can be any display device to which the in-cell touch sensor technology is applicable.

A description will be given of a touch sensor integrated display device according to an embodiment of the present disclosure with reference to FIGS. 4 and 5.

Figure 1:
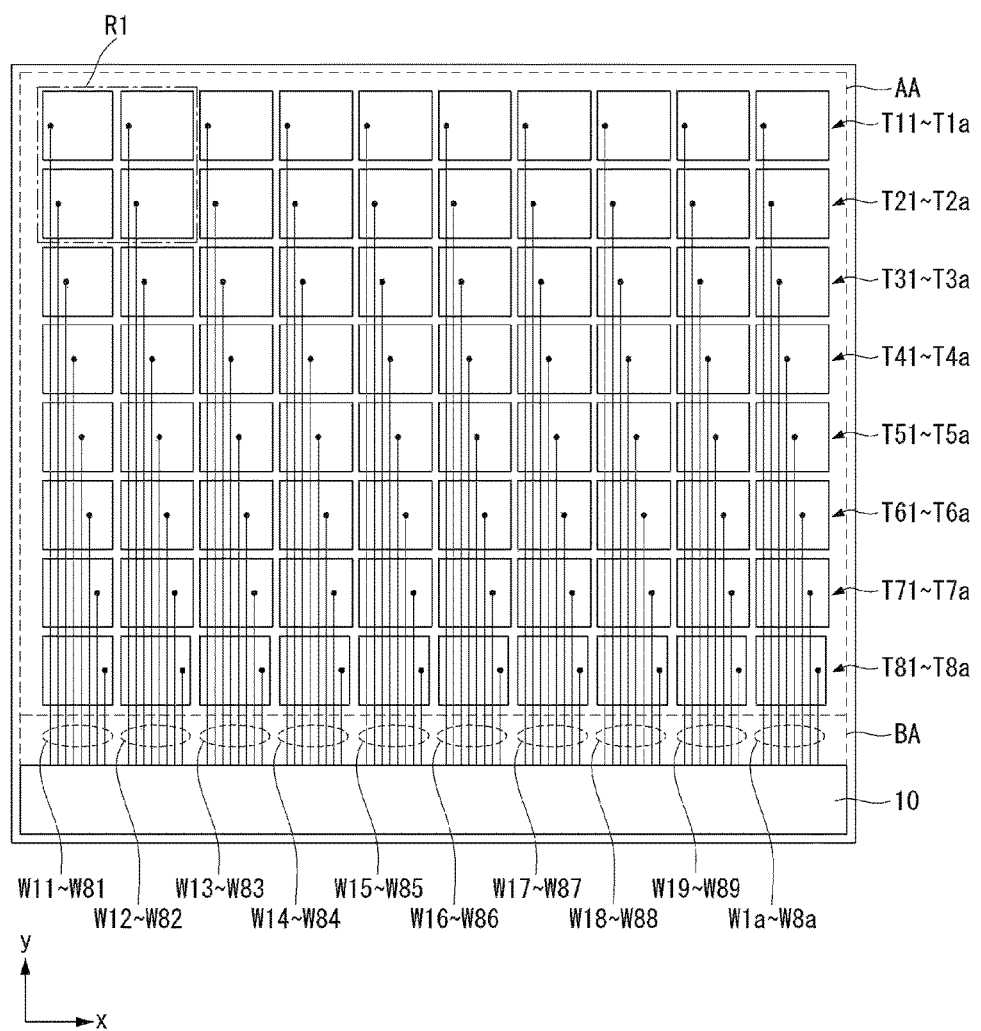
FIG. 1 is a plan view illustrating touch/common lines connected to touch/common electrodes formed by dividing a common electrode in a touch sensor integrated display device of the related art.
Figure 2:
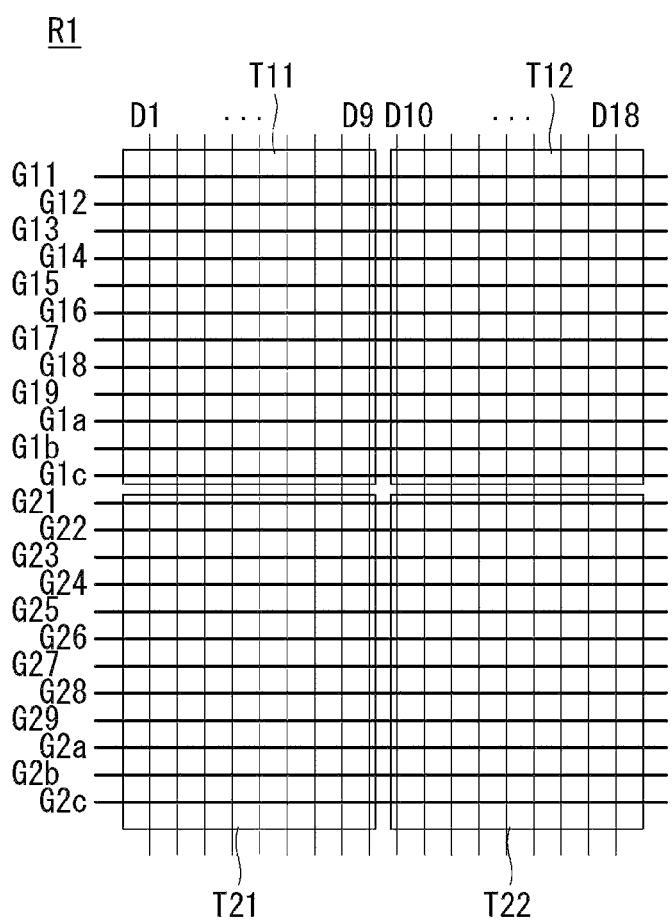
FIG. 2 is a plan view illustrating a region R1 shown in FIG. 1.
Figure 3:
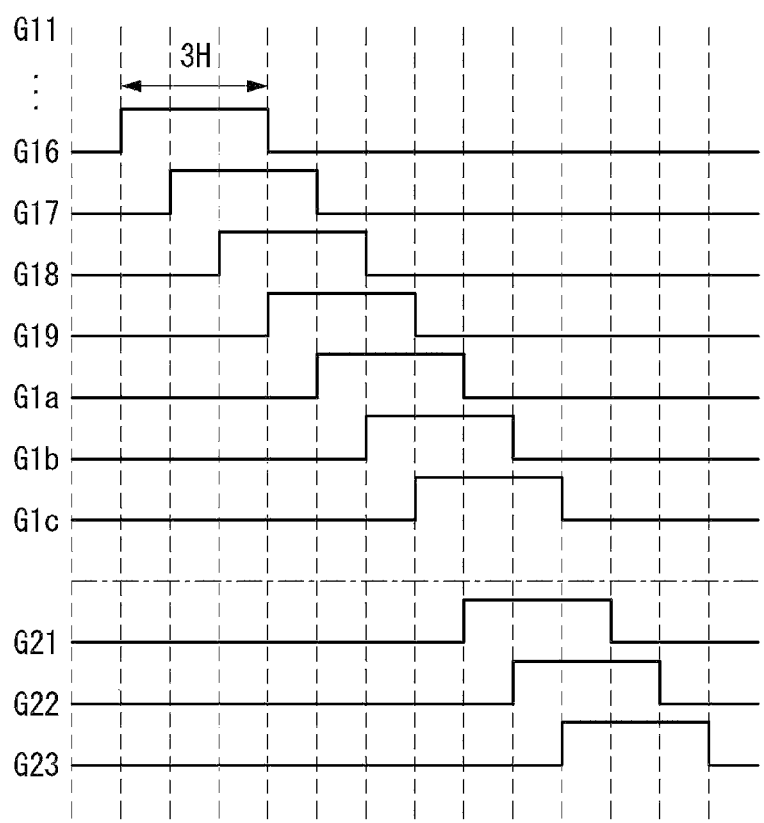
FIG. 3 is a waveform diagram illustrating gate signals supplied to gate lines shown in FIG. 2.
Figure 4:
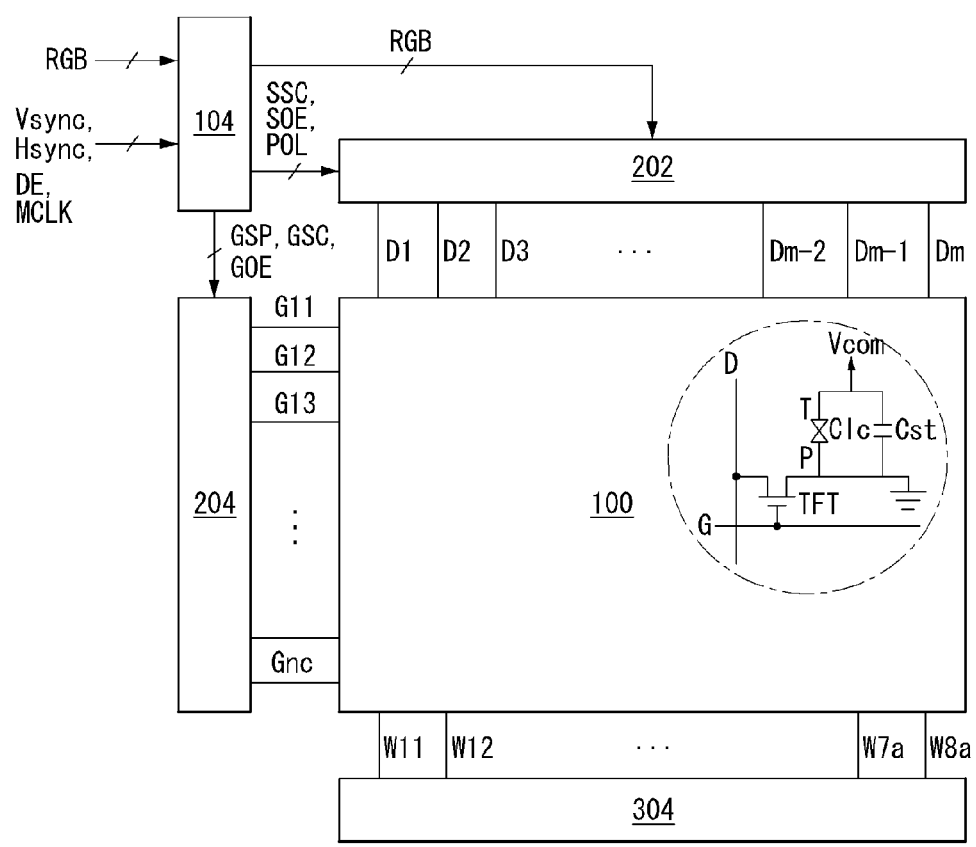
FIG. 4 is a block diagram illustrating a touch sensor integrated display device according to an embodiment of the present disclosure.
Figure 5:
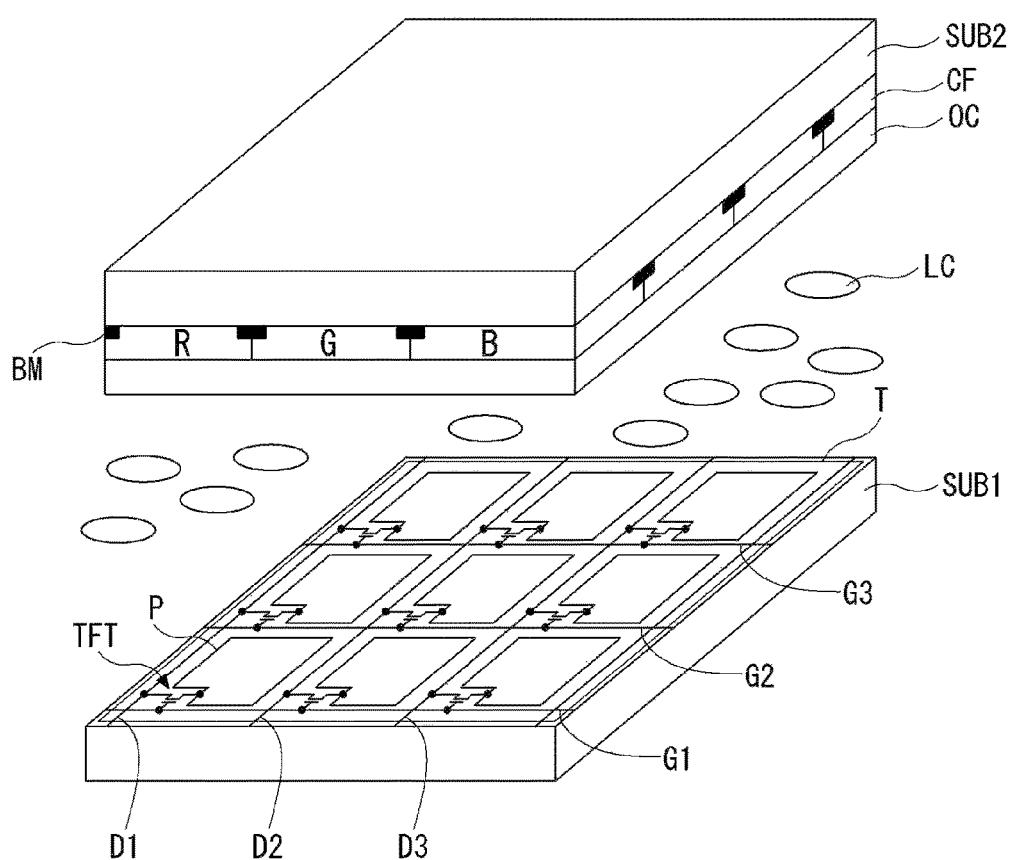
FIG. 5 is an exploded perspective view illustrating part of the touch sensor integrated display device according to an embodiment of the present disclosure.

FIG. 4 is a block diagram illustrating the touch sensor integrated display device according to an embodiment of the present disclosure and FIG. 5 is an exploded perspective view illustrating part of the touch sensor integrated display device according to an embodiment of the present disclosure.

The touch sensor integrated display device according to an embodiment of the present disclosure includes a display panel 100, a data driving circuit 202, a scan driving circuit 204, a timing controller 104 and a touch controller 304.

The display panel 100 includes a liquid crystal layer interposed between two glass substrates. A plurality of data lines D1 to Dm (m being a positive integer), a plurality of gate lines G1 to Gn (n being a positive integer) intersecting the data lines D1 to Dm, a plurality of thin film transistors TFTs formed at intersections of the data lines D1 to Dm and the gate lines G1 to Gn, and a pixel array including a plurality of pixel electrodes P for charging a data voltage in liquid crystal cells Clc, storage capacitors Cst connected to the pixel electrodes P to maintain voltages of the liquid crystal cells, and touch/common electrodes T are formed on the lower substrate SUB1 of the display panel 100.

Pixels of the display panel 100 are formed in pixel regions defined by the data lines D1 to Dm and the gate lines G1 to Gn and arranged in a matrix form. The liquid crystal cell of each pixel is driven by an electric field applied in response to a voltage difference between a data voltage applied to the pixel electrode P and a common voltage Vcom applied to the touch/common electrode T to control the quantity of transmission of incident light. The TFTs are turned on in response to gate pulses from the gate lines G1 to Gn to supply voltages from the data lines D1 to Dm to the pixel electrodes P of the liquid crystal cells.

The upper glass substrate SUB2 of the display panel 100 may include a black matrix BM, color filters R, G and B and an overcoat layer OC covering the black matrix BM and the color filters R, G and B. The lower glass substrate SUB1 of the display panel 100 may be realized in a color filter one TFT (COT) structure. In this case, the black matrix and the color filters may be formed on the lower glass substrate SUB1 of the display panel 100.

The touch/common electrodes T may be formed on the upper glass substrate SUB2 in a vertical field driving mode such as a TN (Twisted Nematic) mode and a VA (Vertical Alignment) mode, and may be formed along with the pixel electrodes P on the lower glass substrate SUB1 (as shown in FIG. 5) in a horizontal field driving mode such as an IPS (In Plane Switching) mode or a FFS (Fringe Field Switching) mode. The touch/common electrodes T can be provided with a common voltage Vcom through touch/common lines W11 to W8a.

Polarizers are respectively attached to the upper glass substrate SUB2 and the lower glass substrate SUB1 of the display panel 100 and alignment films for setting a liquid crystal pretilt angle are respectively formed on the inner sides of the upper and lower glass substrates SUB2, SUB1 coming into contact with liquid crystal. Column spacers for maintaining a cell gap of the liquid crystal cells may be formed between the upper glass substrate SUB2 and the lower glass substrate SUB1 of the display panel 100.

The data driving circuit 202 includes a plurality of source driving ICs (Integrated Circuits). The source drive ICs output analog video data voltages for a predetermined display period. The source drive ICs latch digital video data RGB input from the timing controller 104. The source drive ICs convert the digital video data RGB into analog positive/negative gamma compensation voltages to output analog video data voltages. The analog video data voltages are supplied to the data lines D1 to Dm.

The scan driving circuit 204 includes one or more scan drive ICs. The scan drive ICs sequentially supply scan pulses (or gate pulses) synchronized with the analog video data voltages to the gate lines G1 to Gn under the control of the timing controller 104 for the display period to select lines of the display panel to which the analog video data voltages are written. The scan pulses are generated as pulses swinging between a gate high voltage and a gate low voltage. The scan driving circuit 204 does not generate the scan pulses, but instead continuously provides the gate low voltage to the gate lines G1 to Gn during a touch sensor driving period. Accordingly, the gate lines G1 to Gn sequentially select lines to which data will be written in the display panel 100 by supplying the gate pulses to the TFTs of the pixels during the display period, and maintain the gate low voltage during the touch sensor driving period.

The timing controller 104 receives timing signals such as a vertical synchronization signal Vsync, a horizontal synchronization signal Hsync, a data enable signal DE and a main clock signal MCLK input from an external host system and generates timing control signals for controlling operation timing of the data driving circuit 202 and the scan driving circuit 204 and a touch/display control signal Ctd for controlling a switching block SB. Timing control signals of the scan driving circuit 204 include a gate start pulse signal GSP, a gate shift clock signal GSC, a gate output enable signal GOE and a shift direction control signal DIR. Timing control signals of the data driving circuit 202 include a source sampling clock signal SSC, a polarity control signal (POL) and a source output enable signal SOE.

The timing controller 104 controls the timing control signals to time-divide one frame period into at least one display period and at least one touch driving period. The timing controller 104 enables outputs of the data driving circuit 202 and the scan driving circuit 204 for the display period to display video data on pixels. The timing controller 104 drives a touch controller (304) to detect a touch point of a touchscreen during the touch driving period. The display period and the touch driving period can be appropriately controlled in consideration of characteristics of the display panel 100 according to display panel type.

The touch controller 304 analyzes a sensing signal sensed through the touch/common lines W11 to W8a using a touch recognition algorithm to calculate coordinate values corresponding to the sensed touch point. Coordinate value data of a touch point, output from the touch controller 304, is transmitted to an external host system (not shown). The host system executes an application program indicated by the coordinate value data of the touch point.

A configuration of a touch sensor integrated display device according to a first embodiment will be described in detail with reference to FIGS. 6 to 9.

Figure 6:
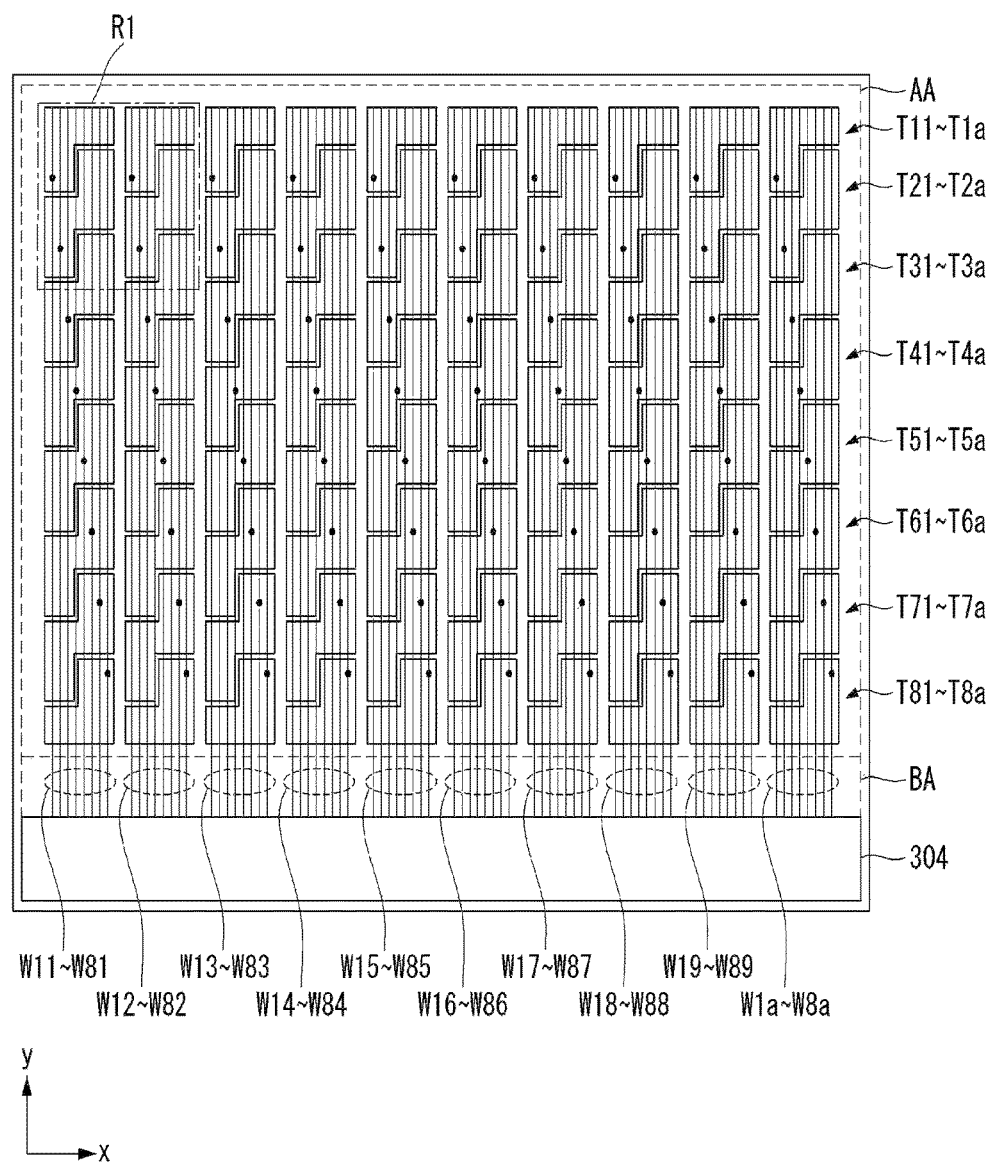
FIG. 6 is a plan view illustrating touch/common electrodes of a touch sensor integrated display device according to a first embodiment of the present disclosure.
Figure 7:
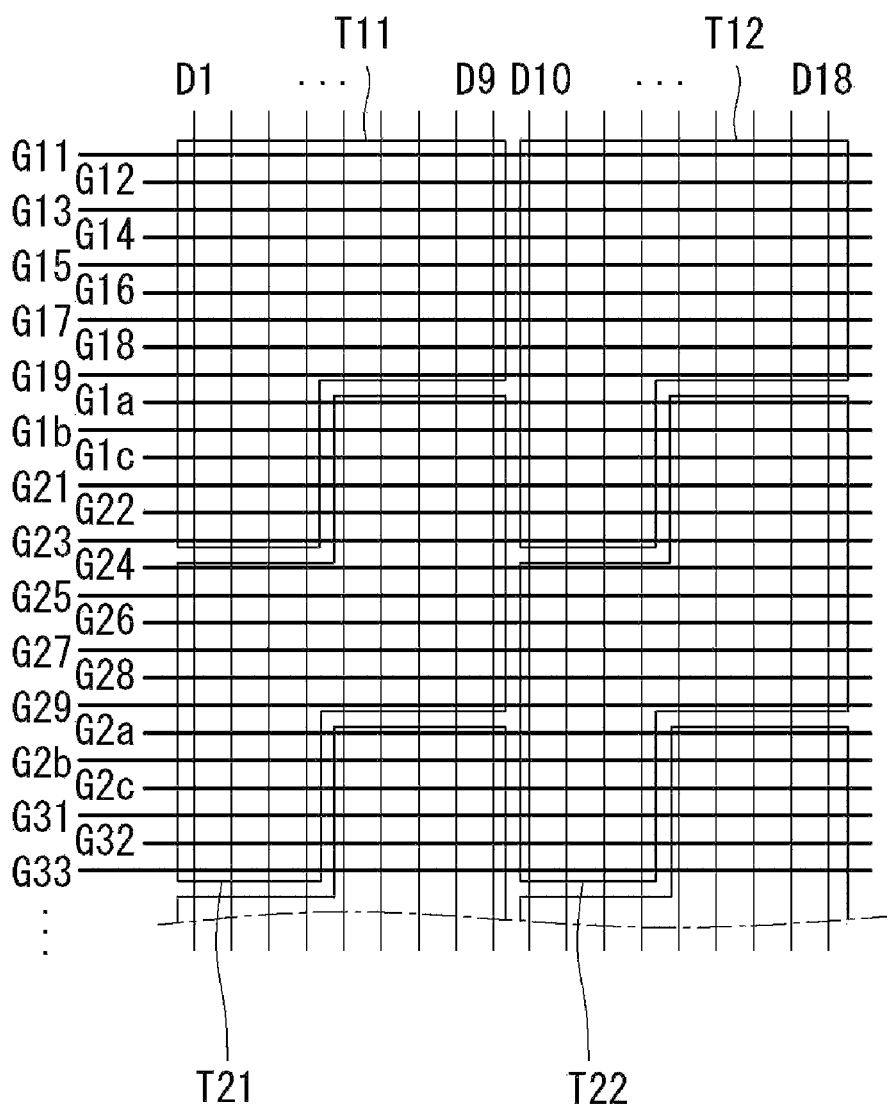
FIG. 7 is a plan view illustrating a region R1 shown in FIG. 6.
Figure 8A:
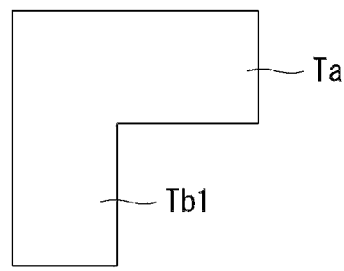
FIGS. 8A, 8B and 8C are plan views illustrating configurations of the touch/common electrodes shown in FIG. 6.
Figure 8B:
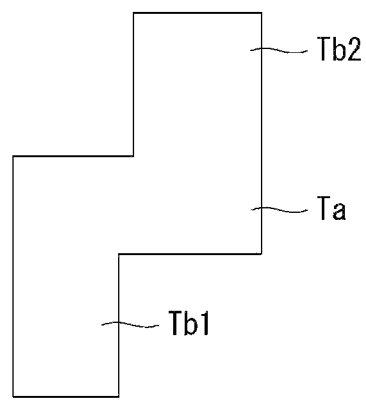
Figure 8C:
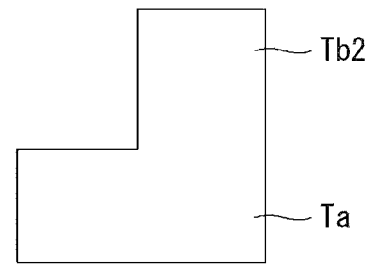
Figure 9:
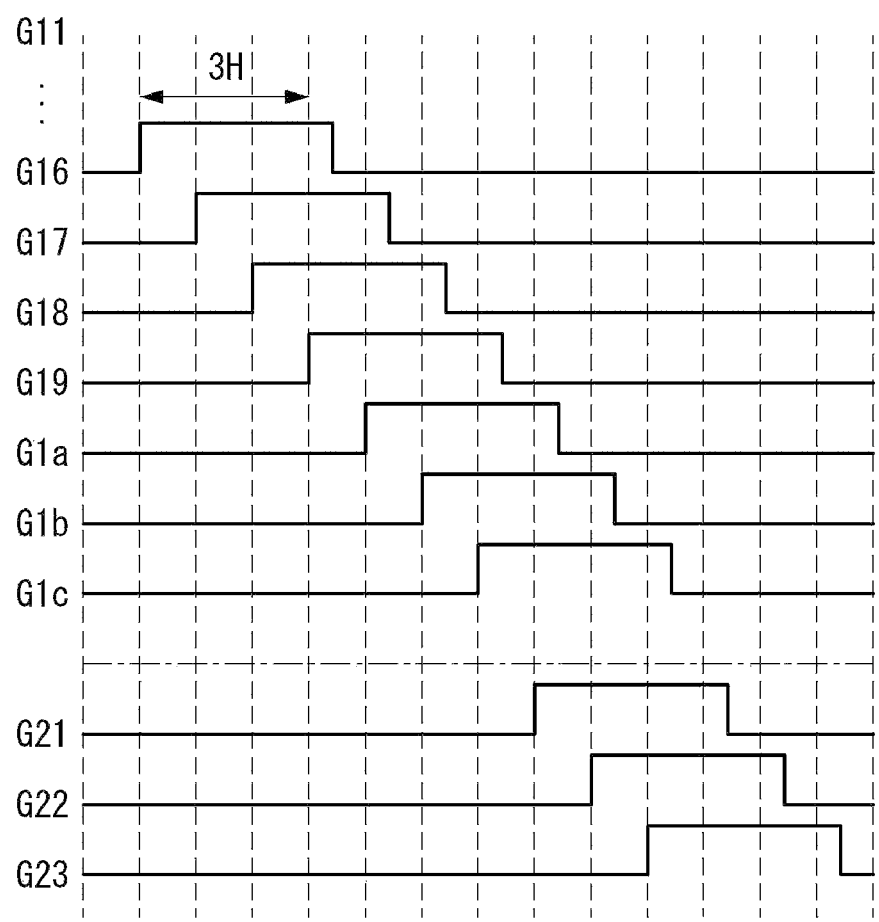
FIG. 9 is a waveform diagram illustrating gate signals supplied to gate lines of FIG. 6.

FIG. 6 is a plan view illustrating touch/common electrodes and touch/common lines of the touch sensor integrated display device according to the first embodiment of the present disclosure and FIG. 7 is a plan view illustrating a region R1 shown in FIG. 6. FIGS. 8A, 8B and 8C are plan views illustrating shapes of the touch/common electrodes shown in FIG. 6 and FIG. 9 is a waveform diagram illustrating gate signals supplied to gate lines of FIG. 6.

Referring to FIG. 6, a display panel of the touch sensor integrated display device according to the first embodiment of the present disclosure includes an active area AA in which touch/common electrodes T11 to T8a and pixel electrodes (not shown) are arranged and data is displayed, and a bezel area BA arranged outside the active area AA and having various wires and the touch controller 304 arranged therein.

The active area AA includes the plurality of touch/common electrodes T11 to T8a arranged in a first direction (e.g., x-axis direction) and a second direction (e.g., y-axis direction) perpendicular to each other, and the plurality of touch/common lines W11 to W8a arranged in parallel in the second direction to connect the touch/common electrodes T11 to T8a to the touch controller 304.

The touch/common electrodes T11 to T8a arranged in the active area AA are formed in such a manner that common electrodes of the display device are divided, serve as common electrodes in a display mode for displaying data and serve as touch electrodes during touch driving for recognizing a touch point.

That is, the touch sensor integrated display device according to the first embodiment of the present disclosure operates in a display driving period and a touch sensor driving period obtained by time-dividing one frame period. The touch/common electrodes T11 to T8a are provided with a common voltage through the touch/common lines W11 to W8a for the display driving period and are provided with a touch driving voltage through the touch/common lines W11 to W8a for the touch driving period. The touch/common lines W11 to W8a additionally provide touch sensing voltages sensed from the touch/common electrodes T11 to T8a to the touch controller 304 for the touch driving period. The touch controller 304 determines whether touch is applied and determines a corresponding touch point using a known touch algorithm.

In the touch sensor integrated display device according to the first embodiment of the present disclosure, the touch/common electrodes T11 to T8a include protrusions arranged or extending in the direction in which the data lines D1, D2, . . . are arranged (e.g., the column direction), as illustrated in FIG. 7.

For example, the touch/common electrodes T11 to T1a arranged in the first row include protrusions disposed at first sides thereof (e.g., the lower side, as shown) facing and extending toward the touch/common electrodes T21 to T2a arranged in the second row adjacent to the touch/common electrodes T11 to T1a. The touch/common electrodes T21 to T2a arranged in the second row include protrusions disposed at the first sides thereof (e.g., the lower side) facing and extending toward the touch/common electrodes T31 to T3a arranged in the third row adjacent to and below the touch/common electrodes T21 to T2a, and protrusions disposed at second sides thereof (e.g., the upper side) facing and extending toward the touch/common electrodes T11 to T1a arranged in the first row adjacent to and above the touch/common electrodes T21 to T2a. In this manner, the touch/common electrodes T31 to T3a, T41 to T4a, T51 to T5a, T61 to T6a and T71 to T7a arranged between the second row and the last row have protrusions arranged at the first sides and the second sides. The touch/common electrodes T81 to T8a arranged in the last row include protrusions arranged at the second sides (e.g., the upper side) facing and extending toward the touch/common electrodes T71 to T7a of the seventh row adjacent to and above the touch/common electrodes T71.

The protrusions formed at the first sides of the touch/common electrodes T11 to T1a in the first row and the protrusions formed at the second sides of the touch/common electrodes T21 to T2a in the second row are alternately arranged in the direction in which gate lines G11 to Gnc are arranged. The protrusions formed at the first sides of the touch/common electrodes T21 to T2a of the second row and the protrusions formed at the second sides of the touch/common electrodes T31 to T3a of the third row are alternately arranged in the direction in which gate lines G11 to Gnc are arranged. In this manner, neighboring protrusions of the touch/common electrodes in the first to last rows are alternately arranged in the gate line arrangement direction (e.g., in the row direction).

The touch/common electrodes T11 to T8a of the touch sensor integrated display device according to the first embodiment of the present disclosure have different shapes depending on arrangement positions thereof.

Shapes of the touch/common electrodes will be described in detail with reference to FIGS. 8A, 8B and 8C.

FIG. 8A is a plan view illustrating the shape of the touch/common electrodes T11 to T1a arranged in the first row of the active area AA shown in FIG. 6. FIG. 8B is a plan view illustrating the shape of the touch/common electrodes T21 to T2a, T31 to T3a, T41 to T4a, T51 to T5a, T61 to T6a and T71 to T7a arranged between the first row and the last row of the active area AA shown in FIG. 6. FIG. 8C is a plan view illustrating the shape of the touch/common electrodes T81 to T8a arranged in the last row (eighth row) of the active area AA shown in FIG. 6.

Referring to FIG. 8A, each of the touch/common electrodes T11 to T1a arranged in the first row includes a body Ta and a first protrusion Tb1 extended from the first side of the body Ta. The first protrusion Tb1 extended from the first side of the body Ta of each of the touch/common electrodes T11 to T1a in the first row adjoins (i.e., neighbors, but does not directly contact) a corresponding touch/common electrode of the touch/common electrodes T21 to T2a arranged in the second row.

Referring to FIG. 8B, each of the touch/common electrodes T21 to T2a, T31 to T3a, T41 to T4a, T51 to T5a, T61 to T6a and T71 to T7a arranged between the first row and the last row includes a first protrusion Tb1 and a second protrusion Tb2 respectively formed at opposite sides. That is, each of the touch/common electrodes T21 to T2a, T31 to T3a, T41 to T4a, T51 to T5a, T61 to T6a and T71 to T7a includes a body Ta, the first protrusion Tb1 extended from the first side of the body Ta, and the second protrusion Tb2 extended from the second side opposite the first side of the body Ta. The first side of the body Ta of each of the touch/common electrodes T21 to T2a, T31 to T3a, T41 to T4a, T51 to T5a, T61 to T6a and T71 to T7a adjoins a corresponding touch/common electrode arranged in the lower row and the second side thereof adjoins a corresponding touch/common electrode arranged in the upper row.

Referring to FIG. 8C, each of the touch/common electrodes T81 to T8a arranged in the last row includes a body Ta and a second protrusion Tb2 extended from the second side of the body Ta. The second side of each of the touch/common electrodes T81 to T8a adjoins a corresponding touch/common electrode of the touch/common electrodes T71 to T7a arranged in the upper row (i.e., the row adjacent to and above the last row).

In the touch/common electrodes shown in FIGS. 8A, 8B and 8C, the touch/common electrodes T11 to T1a arranged in the first row and the touch/common electrodes T81 to T8a arranged in the last row have the same size. The size of the touch/common electrodes T21 to T2a, T31 to T3a, T41 to T4a, T51 to T5a, T61 to T6a and T71 to T7a arranged between the first row and the last row is greater than the size of the touch/common electrodes T11 to T1a and T81 to T8a arranged in the first row and last row by the size of the first protrusion Tb1 formed at the first side.

A description will be given of the arrangements of the touch/common electrodes T11 to T8a and the gate lines G11 to G2c with reference to FIGS. 6 to 8C.

Referring to FIGS. 7 to 8C, the first protrusions Tb1 (refer to FIG. 8A) of the touch/common electrodes T11 and T12 arranged in the first row and the second protrusions Tb2 of the touch/common electrodes T21 and T22 arranged in the second row are alternately arranged in the arrangement direction of the gate lines G1a to G23. In addition, the first protrusions Tb1 (refer to FIG. 8B) of the touch/common electrodes T21 and T22 arranged in the second row and the second protrusions Tb2 of the touch/common electrodes T31 and T32 arranged in the third row are alternately arranged in the arrangement direction of the gate lines G2a to G33. In this manner, the first protrusions Tb1 of the touch/common electrodes T21 to T2a, T31 to T3a, T41 to T4a, T51 to T5a, T61 to T6a and T71 to T7a arranged between the first row and the last row overlap with gate lines corresponding to the touch/common electrodes of the next rows and the second protrusions Tb2 thereof overlap with gate lines corresponding to the touch/common electrodes of the previous row. The second protrusions Tb2 of the touch/common electrodes arranged in the last row overlap with the gate lines G7a to G7c corresponding to the touch/common electrodes T71 to T7a arranged in the seventh row, that is, the touch/common electrodes of the previous row.

As described above, the first protrusions Tb1 of the touch/common electrodes T11 to T8a and the second protrusions Tb2 of the touch/common electrodes of the next rows, arranged in the data line direction, share parts of gate lines corresponding to neighboring touch/common electrodes. Similarly, the second protrusions Tb2 of the touch/common electrodes T11 to T8a and the first protrusions Tb1 of the touch/common electrodes of the previous rows share parts of gate lines corresponding to neighboring touch/common electrodes. That is, the first protrusion Tb1 and the second protrusion Tb2 belong to different touch/common electrodes and are alternately arranged in the gate line arrangement direction and thus share parts of (i.e., are overlapped by) gate lines corresponding to different rows of touch/common electrodes.

In the present disclosure, the number of gate lines shared by the first protrusions Tb1 and the second protrusions Tb2 depends on a degree of overlap of gate pulses sequentially supplied to the gate lines.

In the touch sensor integrated display device according to the first embodiment of the present disclosure, the number of gate lines shared by touch/common electrodes adjacent to each other in the data line arrangement direction (i.e., the number of gate lines shared by the first protrusions Tb1 and the second protrusions Tb2) is 6, for example. This will be described in more detail with reference to FIGS. 7 and 9.

Referring to FIG. 9, gate pulses including rising edges and falling edges are sequentially provided to gate lines G11 to G1c corresponding to the first touch/common electrodes T11 to T1a of the touch sensor integrated display device according to the first embodiment of the present disclosure. In the example of FIG. 9, the number of gate pulses overlapping with one gate pulse is 3. That is, for any given gate pulse, there are three subsequent gate pulses that overlap with at least a portion of the given gate pulse.

Referring to FIGS. 7 and 9, when gate signals are sequentially provided to the (1-1)th to (1-12)th gate lines G11 to G1c corresponding to the touch/common electrodes T11 to T1a arranged in the first row and the gate lines G21 to G2c corresponding to the touch/common electrodes T21 to T2a arranged in the second row, coupling occurs in the touch/common electrodes T11 to T1a and T21 to T2a according to on/off voltage levels of the gate signals supplied to the gate lines, causing generation of a ripple voltage at a rising edge and a falling edge of each gate signal.

The ripple voltage is generated when the gate signal is supplied to each gate line but is offset by a subsequent gate signal. For example, ripple voltages of the touch/common electrodes T11 to T1a due to a falling edge of the gate signal supplied to the (1-6)th gate line G16 are offset by ripple voltages of the touch/common electrodes T11 to T1a due to a rising edge of the gate signal provided to the (1-9)th gate line G19, ripple voltages of the touch/common electrodes T11 to T1a due to the (1-7)th gate line G17 are offset by ripple voltages of the touch/common electrodes T11 to T1a due to the (1-10)th gate line G1a, ripple voltages of the touch/common electrodes T11 to T1a due to the (1-8)th gate line G18 are offset by ripple voltages of the touch/common electrodes T11 to T1a due to the (1-11)th gate line G1b, and ripple voltages of the touch/common electrodes T11 to T1a due to the (1-9)th gate line G19 are offset by ripple voltages of the touch/common electrodes T11 to T1a due to the (1-12)th gate line G1c.

In addition, ripple voltages of the touch/common electrodes T11 to T1a due to a falling edge of the gate signal supplied to the (1-10)th gate line G1a are offset by ripple voltages of the first protrusions Tb1 of the touch/common electrodes T11 to T1a due to a rising edge of the gate signal provided to the (2-1)th gate line G21, ripple voltages of the touch/common electrodes T11 to T1a due to a falling edge of the gate signal supplied to the (1-11)th gate line G1b are offset by ripple voltages of the first protrusions Tb1 of the touch/common electrodes T11 to T1a due to a rising edge of the gate signal provided to the (2-2)th gate line G22, and ripple voltages of the touch/common electrodes T11 to T1a due to a falling edge of the gate signal supplied to the (1-12)th gate line G1c are offset by ripple voltages of the first protrusions Tb1 of the touch/common electrodes T11 to T1a due to a rising edge of the gate signal provided to the (2-3)th gate line G23.

As described above, ripple voltages generated in all touch/common electrodes of the touch sensor integrated display device according to the first embodiment of the present disclosure can be offset by gate pulses supplied to the gate lines. Accordingly, it is possible to prevent a defective image in the form of a bright horizontal line generated when a common voltage level becomes unstable due to a ripple voltage level difference between the touch/common electrodes and boundaries thereof.

A description will be given of a configuration of a touch sensor integrated display device according to a second embodiment of the present disclosure with reference to FIGS. 10 and 11.

Figure 10:
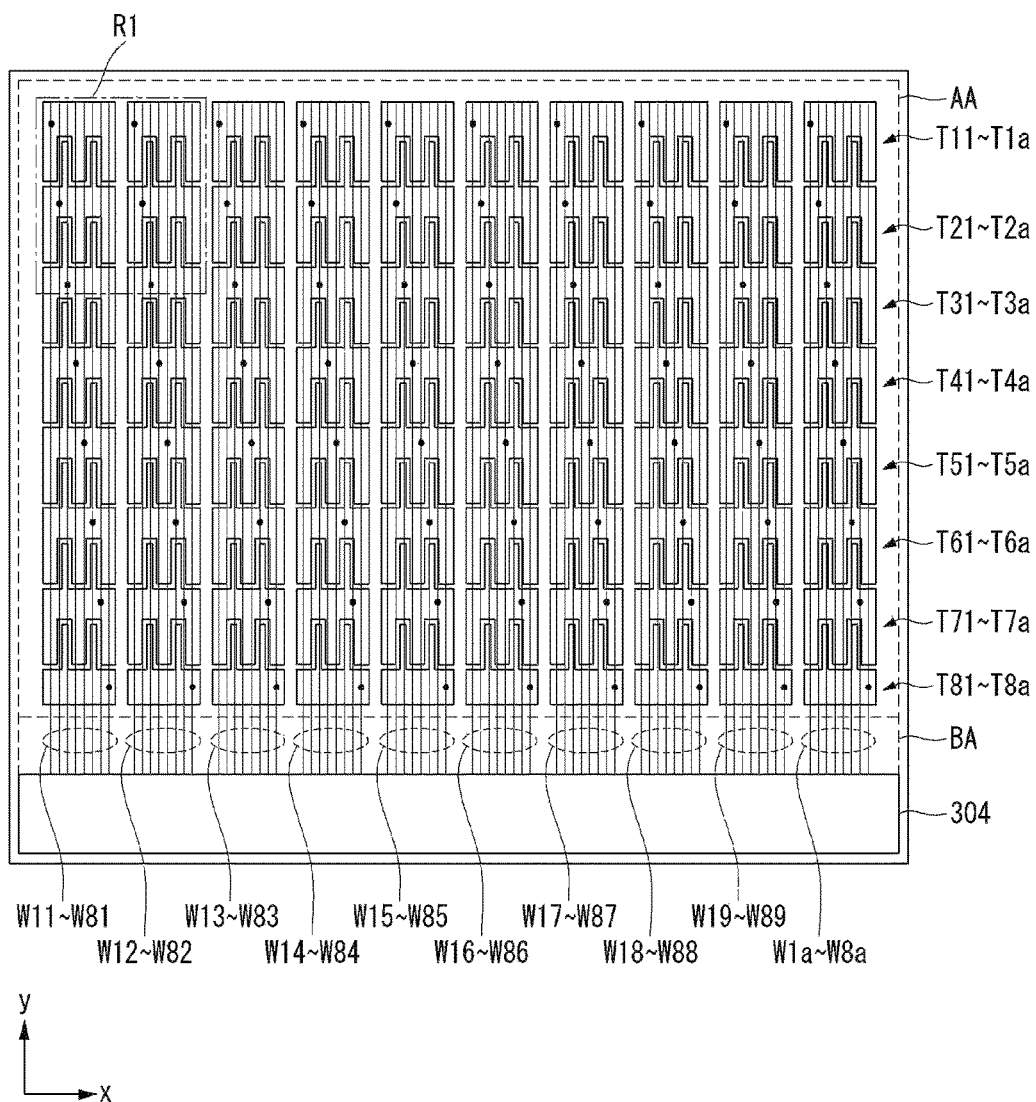
FIG. 10 is a plan view illustrating touch/common electrodes of a touch sensor integrated display device according to a second embodiment of the present disclosure.
Figure 11:
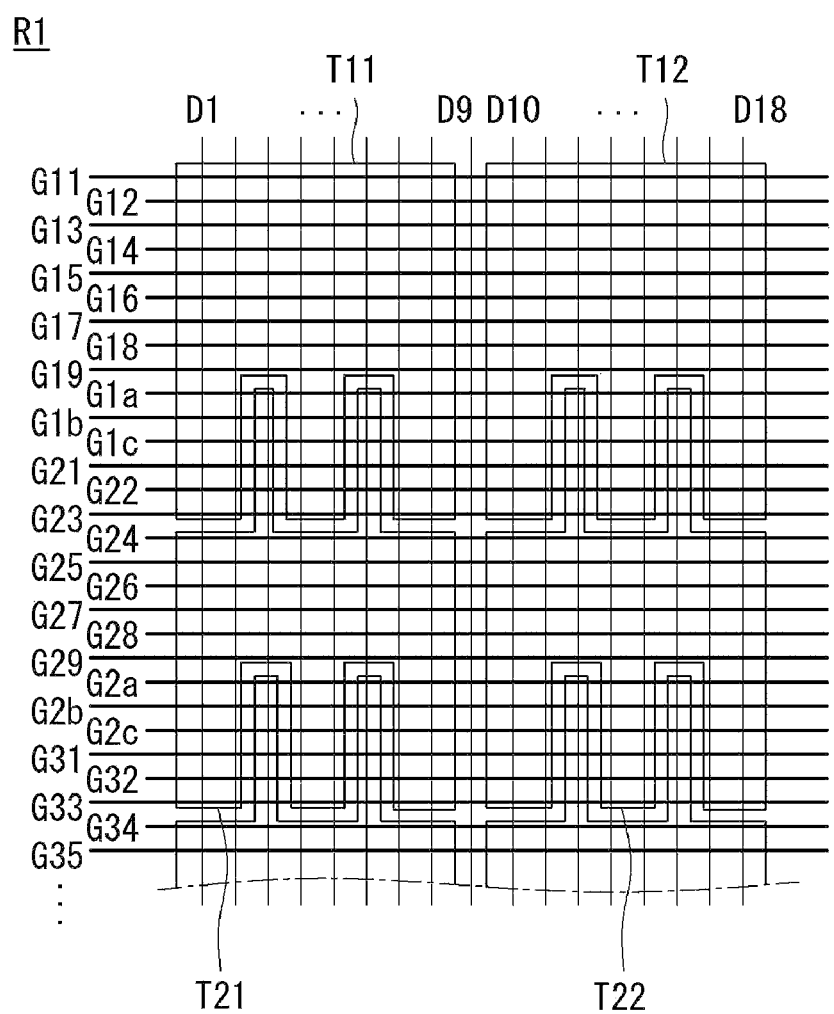
FIG. 11 is a plan view illustrating a region R1 shown in FIG. 10.
Figure 12A:
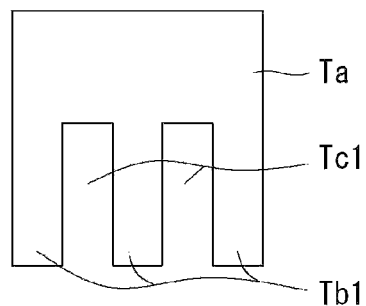
FIGS. 12A, 12B and 12C are plan views illustrating configurations of the touch/common electrodes shown in FIG. 10.
Figure 12B:
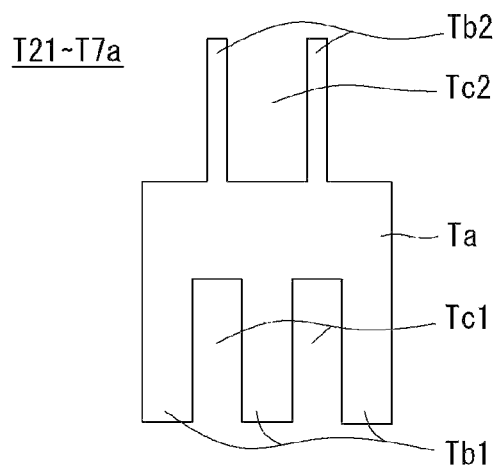
Figure 12C:
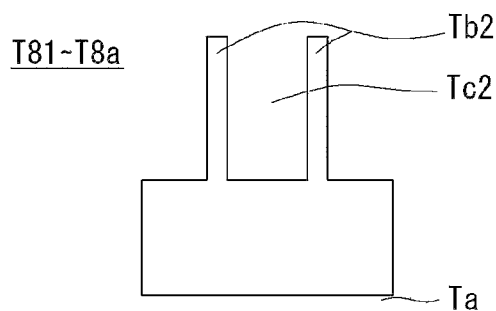
Figure 13:
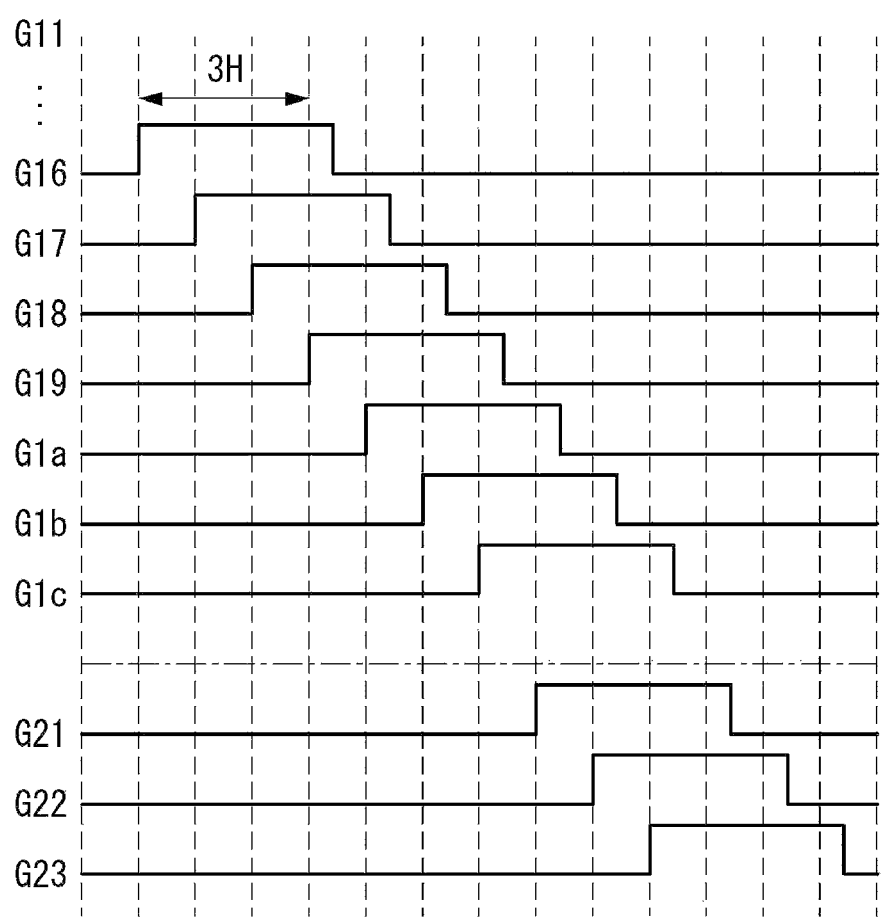
FIG. 13 is a waveform diagram illustrating gate signals supplied to gate lines of FIG. 11.

FIG. 10 is a plan view illustrating touch/common electrodes of the touch sensor integrated display device according to the second embodiment of the present disclosure and FIG. 11 is a plan view illustrating a region R1 shown in FIG. 10. FIGS. 12A, 12B and 12C are plan views illustrating shapes of the touch/common electrodes shown in FIG. 10 and FIG. 13 is a waveform diagram illustrating gate signals supplied to gate lines shown in FIG. 11.

The touch sensor integrated display device according to the second embodiment of the present disclosure is substantially the same as the touch sensor integrated display device according to the first embodiment of the present disclosure aside from the shapes of the touch/common electrodes. Accordingly, only a difference between the first and second embodiments of the present disclosure will be described for simplification of description.

In the touch sensor integrated display device according to the second embodiment of the present disclosure, the touch/common electrodes T11 to T8a include protrusions projected to (i.e., extending toward) neighboring touch/common electrodes and recesses formed by the protrusions, as illustrated in FIG. 10.

For example, the touch/common electrodes T11 to T1a arranged in the first row include protrusions formed at the first sides (e.g., a lower side) and projected to the touch/common electrodes T21 to T2a arranged in the second row adjacent to the first row and recesses formed by the protrusions (e.g., recesses that are formed between respective protrusions). The touch/common electrodes T21 to T2a arranged in the second row include protrusions formed at the first sides (e.g., the lower side) and projected to the touch/common electrodes T31 to T3a arranged in the third row adjacent to and below the second row, recesses formed by the protrusions, protrusions formed at the second sides (e.g., an upper side) and projected to the touch/common electrodes T11 to T1a arranged in the first row adjacent to and above the second row, and recesses formed by the protrusions formed at the second sides (e.g., recesses that are formed between respective upper protrusions). In this manner, the touch/common electrodes T31 to T3a, T41 to T4a, T51 to T5a, T61 to T6a and T71 to T7a arranged between the second row and the last row include protrusions arranged at the first sides and the second sides and recesses formed by the protrusions. The touch/common electrodes T81 to T8a arranged in the last row include protrusions arranged at the second sides (e.g., the upper sides) and projected to the touch/common electrodes T71 to T7a of the seventh row adjacent to and above the last row and recesses formed by the protrusions.

The protrusions formed at the first sides of the touch/common electrodes T11 to T1a of the first row are respectively disposed in the recesses formed at second sides of the touch/common electrodes T21 to T2a of the second row, and the protrusions formed at the second sides of the touch/common electrodes T21 to T2a of the second row are respectively disposed in the recesses formed at the first sides of the touch/common electrodes T11 to T1a of the first row. Accordingly, the protrusions formed at the first sides of the touch/common electrodes T11 to T1a of the first row and the protrusions formed at the second sides of the touch/common electrodes T21 to T2a of the second row are alternately arranged in the gate line arrangement direction.

The protrusions formed at the first sides of the touch/common electrodes T21 to T2a of the second row are respectively disposed in the recesses formed at second sides of the touch/common electrodes T31 to T3a of the third row, and the protrusions formed at the second sides of the touch/common electrodes T31 to T3a of the third row are respectively disposed in the recesses formed at the first sides of the touch/common electrodes T21 to T2a of the second row. Accordingly, the protrusions formed at the first sides of the touch/common electrodes T21 to T2a of the second row and the protrusions formed at the second sides of the touch/common electrodes T31 to T3a of the third row are alternately arranged in the gate line arrangement direction.

In this manner, the protrusions of neighboring touch/common electrodes of the first to last rows are alternately arranged in the gate line direction.

The touch/common electrodes T11 to T8a of the touch sensor integrated display device according to the second embodiment of the present disclosure may have different shapes depending on arrangement positions thereof.

A description will be given of the shapes of the touch/common electrodes with reference to FIGS. 12A, 12B and 12C.

FIG. 12A is a plan view illustrating the shape of the touch/common electrodes T11 to T1a arranged in the first row of the active area AA shown in FIG. 10. FIG. 12B is a plan view illustrating the shape of the touch/common electrodes T21 to T2a, T31 to T3a, T41 to T4a, T51 to T5a, T61 to T6a and T71 to T7a arranged between the first row and the last row (eighth row) of the active area AA shown in FIG. 10. FIG. 12C is a plan view illustrating the shape of the touch/common electrodes T81 to T8a arranged in the last row (eighth row) of the active area AA shown in FIG. 10.

Referring to FIG. 12A, each of the touch/common electrodes T11 to T1a arranged in the first row includes a body Ta, first protrusions Tb1 extended from the first side (e.g., the lower side) of the body Ta and first recesses Tc1 disposed between the first protrusions. The first side of the body Ta adjoins or neighbors a corresponding touch/common electrode of the touch/common electrodes T21 to T2a arranged in the second row.

Referring to FIG. 12B, each of the touch/common electrodes T21 to T2a, T31 to T3a, T41 to T4a, T51 to T5a, T61 to T6a and T71 to T7a arranged between the first row and the last row includes first protrusions Tb1 and second protrusions Tb2 respectively formed at opposite sides (e.g., the lower side and the upper side), first recesses Tc1 disposed between respective pairs of the first protrusions, and a second recess Tc2 disposed between the second protrusions Tb2. Specifically, each of the touch/common electrodes T21 to T2a, T31 to T3a, T41 to T4a, T51 to T5a, T61 to T6a and T71 to T7a includes a body Ta, the first protrusions Tb1 extended from the first side of the body Ta, the first recesses Tc1 disposed between the first protrusions Tb1, the second protrusions Tb2 extended from the second side of the body Ta opposite the first side, and the second recess Tc2 disposed between the second protrusions Tb2. The first side (e.g., the lower side) of the body Ta of each of the touch/common electrodes T21 to T2a, T31 to T3a, T41 to T4a, T51 to T5a, T61 to T6a and T71 to T7a adjoins or neighbors a corresponding second side (e.g., the upper side) of the touch/common electrodes arranged in the adjacent lower row shown in FIG. 10 and the second side thereof adjoins or neighbors a corresponding first side of the touch/common electrodes arranged in the adjacent upper row.

Referring to FIG. 12C, each of the touch/common electrodes T81 to T8a arranged in the last row includes a body Ta, second protrusions Tb2 extended from the second side of the body Ta and a second recess Tc2 disposed between the second protrusions Tb2. The second side of each of the touch/common electrodes T81 to T8a adjoins or neighbors a corresponding first side of the touch/common electrodes T71 to T7a arranged in the adjacent upper row.

In the touch/common electrodes of FIGS. 12A, 12B and 12C, the touch/common electrodes T11 to T1a arranged in the first row and the touch/common electrodes T81 to T8a arranged in the last row have the same or similar size (e.g., the height of the touch/common electrodes of the first and last rows may be substantially the same). The size of the touch/common electrodes T21 to T2a, T31 to T3a, T41 to T4a, T51 to T5a, T61 to T6a and T71 to T7a arranged between the first row and the last row is greater than the size of the touch/common electrodes T11 to T1a and T81 to T8a arranged in the first and last rows. For example, the touch/common electrodes between the first and last rows may have a size that is greater than the touch/common electrodes in the last row that is greater by an amount equal to the size of the first protrusions Tb1 formed at the first side (since the touch/common electrodes in the last row do not include the first protrusion Tb1), and may have a size that is greater than the touch/common electrodes in the first row by an amount equal to the size of the second protrusions Tb2 (since the touch/common electrodes in the first row do not include the second protrusions Tb2).

Referring to FIGS. 10 to 12C, the arrangements of the touch/common electrodes T11 to T8a and the gate lines G11 to G2c are substantially the same as arrangements of the touch/common electrodes T11 to T8a and the gate lines G11 to G2c shown in FIGS. 6 to 8C aside from the shapes of the touch/common electrodes. Accordingly, description of arrangements of the touch/common electrodes T11 to T8a and the gate lines G11 to G2c of the touch sensor integrated display device according to the second embodiment of the present disclosure is omitted to avoid redundant description.

Referring to FIG. 13, gate pulses including rising edges and falling edges are sequentially supplied to the gate lines G11 to G1c corresponding to the first touch/common electrodes T11 to T1a of the touch sensor integrated display device according to the second embodiment of the present disclosure. In the example of FIG. 13, the number of gate pulses overlapping with one gate pulse is 3.

Referring to FIGS. 11 and 13, when gate signals are sequentially provided to the (1-1)th to (1-12)th gate lines G11 to G1c corresponding to the touch/common electrodes T11 to T1a arranged in the first row and the gate lines G21 to G2c corresponding to the touch/common electrodes T21 to T2a arranged in the second row, coupling occurs in the touch/common electrodes T11 to T1a and T21 to T2a according to on/off voltage levels of the gate signals supplied to the gate lines, causing generation of a ripple voltage at a rising edge and a falling edge of each gate signal.

The ripple voltage is generated when the gate signal is supplied to each gate line but is offset by a subsequent gate signal. For example, ripple voltages of the touch/common electrodes T11 to T1a due to a falling edge of the gate signal supplied to the (1-6)th gate line G16 are offset by ripple voltages of the touch/common electrodes T11 to T1a due to a rising edge of the gate signal provided to the (1-9)th gate line G19, ripple voltages of the touch/common electrodes T11 to T1a due to the (1-7)th gate line G17 are offset by ripple voltages of the touch/common electrodes T11 to T1a due to the (1-10)th gate line G1a, ripple voltages of the touch/common electrodes T11 to T1a due to the (1-8)th gate line G18 are offset by ripple voltages of the touch/common electrodes T11 to T1a due to the (1-11)th gate line G1b, and ripple voltages of the touch/common electrodes T11 to T1a due to the (1-9)th gate line G19 are offset by ripple voltages of the touch/common electrodes T11 to T1a due to the (1-12)th gate line G1c.

In addition, ripple voltages of the touch/common electrodes T11 to T1a due to a falling edge of the gate signal supplied to the (1-10)th gate line G1a are offset by ripple voltages of the first protrusions Tb1 of the touch/common electrodes T11 to T1a due to a rising edge of the gate signal provided to the (2-1)th gate line G21, ripple voltages of the touch/common electrodes T11 to T1a due to a falling edge of the gate signal supplied to the (1-11)th gate line G1b are offset by ripple voltages of the first protrusions Tb1 of the touch/common electrodes T11 to T1a due to a rising edge of the gate signal provided to the (2-2)th gate line G22, and ripple voltages of the touch/common electrodes T11 to T1a due to a falling edge of the gate signal supplied to the (1-12)th gate line G1c are offset by ripple voltages of the first protrusions Tb1 of the touch/common electrodes T11 to T1a due to a rising edge of the gate signal provided to the (2-3)th gate line G23.

As described above, ripple voltages generated in all touch/common electrodes of the touch sensor integrated display device according to the second embodiment of the present disclosure can be offset by gate pulses supplied to the gate lines. Accordingly, it is possible to prevent a defective image in the form of a bright horizontal line generated when a common voltage level becomes unstable due to a ripple voltage level difference between the touch/common electrodes and boundaries thereof.

While the number of gate pulses, at least part of which overlaps with one gate pulse, is described as being 3 in the touch sensor integrated display devices according to the first and second embodiments of the present disclosure, the present disclosure is not limited thereto. The number of gate pulses overlapping with one of gate pulses sequentially provided to the gate lines can be set to 1, 2, 3 or more. Gate pulse overlap includes a case in which the falling edge of a gate pulse corresponds to the rising edge of the following gate pulse.

Accordingly, the number of gate lines (e.g., six) shared by neighboring touch/common electrodes (i.e., the first protrusions Tb1 and the second protrusions Tb2) arranged in the data line arrangement direction becomes twice the number of gate pulses (e.g., three) partially overlapping with one of the gate pulses supplied to the gate lines.

A description will be given of common voltages of the touch sensor integrated display device of the related art and the touch sensor integrated display devices according to the embodiments of the present disclosure with reference to FIGS. 14A and 14B.

Figure 14A:
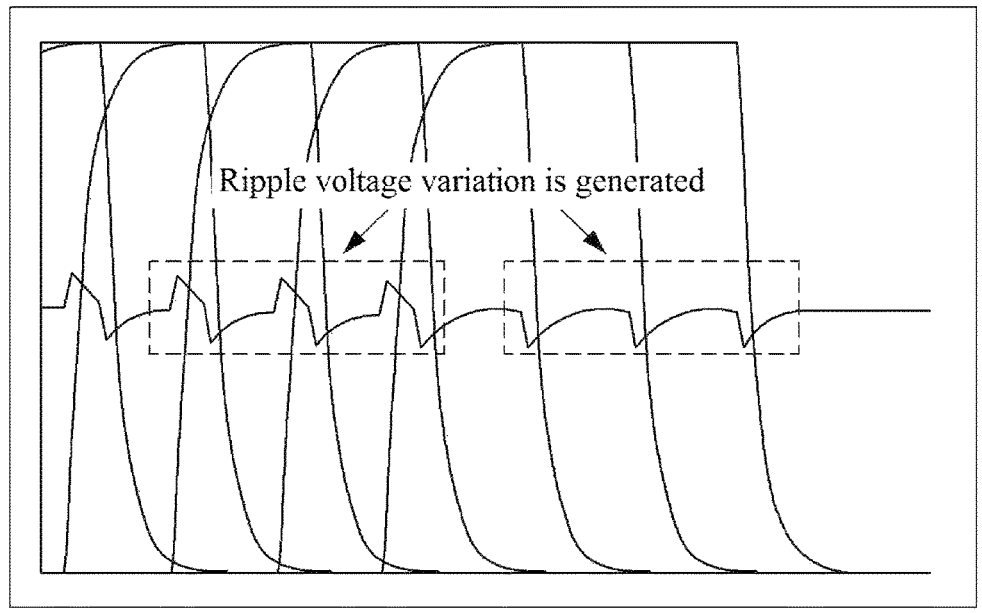
FIG. 14A is a waveform diagram illustrating a common voltage output of a touch sensor integrated display device of the related art.
Figure 14B:
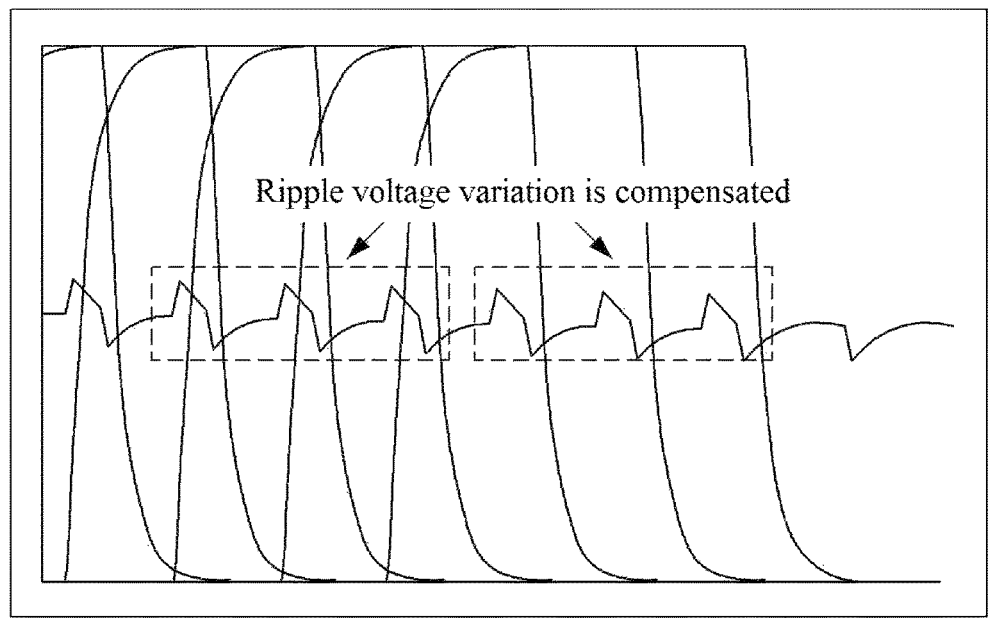
FIG. 14B is a waveform diagram illustrating a common voltage output of the touch sensor integrated display devices according to embodiments of the present disclosure.

FIG. 14A is a waveform diagram illustrating a common voltage output of the touch sensor integrated display device of the related art and FIG. 14B is a waveform diagram illustrating a common voltage output of the touch sensor integrated display devices according to the embodiments of the present disclosure.

Referring to FIGS. 14A and 14B, while ripple voltage variations are generated in touch/common electrodes in the touch sensor integrated display device of the related art, ripple voltage variations are not generated in touch/common electrodes in the touch sensor integrated display devices according to the embodiments of the present disclosure.

Therefore, according to the touch sensor integrated display devices according to the embodiments of the present disclosure, it is possible to prevent a defective image in the form of a bright horizontal line which can be generated when the common voltage level becomes unstable due to a ripple voltage level difference.

Those skilled in the art will appreciate that many modifications and changes can be made to the present disclosure without departing from the spirit and essential characteristics of the present disclosure.

For example, the number of touch/common electrodes, the number of touch/common lines, the number of gate lines and the number of data lines in the touch sensor integrated display devices according to the embodiments of the present disclosure are exemplary and the present disclosure is not limited thereto.

Furthermore, while the protrusions and recesses of the touch/common electrodes of the touch sensor integrated display devices have square or rectangular shapes in the illustrated embodiments of the present disclosure, the present disclosure is not limited thereto. For example, the protrusions and recesses can have any shapes such as a circle and an ellipse.

Therefore, the scope of the disclosure should be determined by the appended claims and their legal equivalents, and should not be limited by the above description.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch sensor integrated display device comprising:
a plurality of gate lines and a plurality of data lines intersecting the gate lines;
a plurality of pixel electrodes respectively disposed in regions defined by intersections of the plurality of data lines and the plurality of gate lines;
a plurality of touch and common electrodes arranged in a plurality of rows, the touch and common electrodes configured to generate electric fields with the plurality of pixel electrodes and to correspond to parts of the plurality of pixel electrodes; and
a plurality of touch and common lines respectively coupled to the plurality of touch and common electrodes,
wherein each touch and common electrode is overlapped by at least one gate line that overlaps and is shared by a neighboring touch and common electrode that is adjacent in a data line arrangement direction, and
wherein gate pulses are sequentially supplied to the plurality of gate lines, and a number of gate lines that overlap and are shared by adjacent touch and common electrodes in the data line arrangement direction is twice a number of gate pulses that partially overlap with a preceding one of the gate pulses.

2. The touch sensor integrated display device according to claim 1, wherein each touch and common electrode includes at least one protrusion in the data line arrangement direction, and protrusions of touch and common electrodes adjacent to each other in the data line arrangement direction are alternately arranged in a gate line arrangement direction.

3. The touch sensor integrated display device according to claim 1, wherein each touch and common electrode includes at least one protrusion and at least one recess alternately disposed at a side facing the neighboring touch and common electrode in the data line arrangement direction, and the protrusions of the touch and common electrodes are disposed in recesses of the neighboring touch and common electrodes in the data line arrangement direction.

4. The touch sensor integrated display device according to claim 3, wherein the protrusions and recesses of the touch and common electrodes arranged in a first row and the protrusions and recesses of the touch and common electrodes arranged in a last row are disposed along only one side that faces the respective neighboring touch and common electrodes arranged in the data line arrangement direction, and the protrusions and recesses of the touch and common electrodes arranged between the first row and the last row are disposed at each of two sides that respectively face neighboring touch and common electrodes arranged in the data line arrangement direction.

5. The touch sensor integrated display device according to claim 4, wherein the protrusions and recesses of the touch and common electrodes arranged between the first row and the last row include first protrusions and first recesses alternately disposed at a first side and second protrusions and second recesses alternately disposed at a second side, and the first protrusions and the second protrusions are alternately arranged and the first recesses and the second recesses are alternately arranged.

6. The touch sensor integrated display device according to claim 5, wherein the touch and common electrodes arranged in the first row and the touch and common electrodes arranged in the last row have a same size, and a size of touch and common electrodes arranged between the first row and the last row is greater than the size of the touch and common electrodes arranged in the first row and the last row by a size of the protrusions formed at the second side.

7. The touch sensor integrated display device according to claim 5, wherein a number of gate lines shared by the touch and common electrodes arranged in the first row equals a number of gate lines shared by the touch and common electrodes arranged in the last row, and
a number of gate lines shared by the touch and common electrodes arranged between the first row and the last row is greater than the number of gate lines shared by the touch and common electrodes arranged in the first row and the last row.

8. The touch sensor integrated display device according to 1, wherein overlapping of gate pulses includes overlapping of a rising edge and a falling edge of gate pulses.

9. A touch sensor integrated display device comprising:
a plurality of gate lines and a plurality of data lines intersecting the gate lines;
a plurality of pixel electrodes respectively disposed in regions defined by intersections of the plurality of data lines and the plurality of gate lines;
a plurality of touch and common electrodes arranged in a plurality of rows, the touch and common electrodes configured to generate electric fields with the plurality of pixel electrodes and to correspond to parts of the plurality of pixel electrodes; and
a plurality of touch and common lines respectively coupled to the plurality of touch and common electrodes,
wherein each touch and common electrode is overlapped by at least one gate line that overlaps and is shared by a neighboring touch and common electrode that is adjacent in a data line arrangement direction,
wherein each touch and common electrode arranged at a first row includes first protrusions extending toward a last row,
wherein each touch and common electrode arranged at the last row includes second protrusions extending toward the first row, and
wherein each touch and common electrode arranged between the first and the last row includes third protrusions extending toward the first row and fourth protrusions extending toward the last row, a number of the third protrusions being different from a number of the fourth protrusions.

10. The touch sensor integrated display device according to claim 9, wherein each touch and common electrode arranged at the first row includes at least one recess disposed between the first protrusions, and
wherein each touch and common electrode arranged at the last row includes least one recess disposed between the second protrusions, and
wherein each touch and common electrode arranged between the first and last rows includes at least one recess disposed between the third protrusions and at least one recess disposed between the fourth.

11. The touch sensor integrated display device according to claim 10, wherein the first protrusions and the at least one recess of the touch and common electrodes arranged in the first row and the second protrusions and the at least one recess of the touch and common electrodes arranged in the last row are disposed along only one side that faces the respective neighboring touch and common electrodes arranged in the data line arrangement direction, and the third and fourth protrusions and the at least one recess of the touch and common electrodes arranged between the first row and the last row are disposed at each of two sides that respectively face neighboring touch and common electrodes arranged in the data line arrangement direction.

12. The touch sensor integrated display device according to claim 11, wherein the touch and common electrodes arranged in the first row and the touch and common electrodes arranged in the last row have a different size, and a size of touch and common electrodes arranged between the first row and the last row is greater than the size of the touch and common electrodes arranged in the first row and the last row.

13. The touch sensor integrated display device according to claim 11, wherein
a number of gate lines shared by the touch and common electrodes arranged between the first row and the last row is greater than the number of gate lines shared by the touch and common electrodes arranged in the first row and the last row.

14. The touch sensor integrated display device according to claim 9, wherein gate pulses are sequentially supplied to the plurality of gate lines, and a number of gate lines that overlap and are shared by adjacent touch and common electrodes in the data line arrangement direction is twice a number of gate pulses that partially overlap with a preceding one of the gate pulses.

15. The touch sensor integrated display device according to claim 14, wherein overlapping of gate pulses includes overlapping of a rising edge and a falling edge of gate pulses.

* * * * *